United States Patent [19]

Erickson

[11] Patent Number: 5,024,063
[45] Date of Patent: Jun. 18, 1991

[54] BRANCHED GAX ABSORPTION VAPOR COMPRESSOR

[76] Inventor: Donald C. Erickson, 1704 S. Harbor La., Annapolis, Md. 21401

[21] Appl. No.: 521,994

[22] Filed: May 11, 1990

[51] Int. Cl.⁵ ............................................. F25B 15/00
[52] U.S. Cl. ...................................... 62/101; 62/112; 62/235.1; 62/335; 62/476
[58] Field of Search ................. 62/235.1, 476, 335, 62/101, 112

[56] References Cited

U.S. PATENT DOCUMENTS

| | | | |
|---|---|---|---|
| 4,542,629 | 9/1985 | Biermann | 62/476 |
| 4,546,620 | 10/1985 | Bierman | 62/476 |
| 4,827,728 | 5/1989 | DeVault et al. | 62/476 X |
| 4,921,515 | 5/1990 | Dao | 62/476 X |

*Primary Examiner*—Lloyd L. King

[57] ABSTRACT

Apparatus and process are disclosed for increasing the quantity of heat exchange possible between the temperature overlap portions of a generator and an absorber in an absorption cycle compressor or heat pump. Referring to FIG. 1, the heat duty of Generator-Absorber Heat Exchange (GAX) absorber 4 is increased and the heat duty of GAX desorber 6 is decreased by branching sorbent flow from absorber 4 at point 7, and circulating the branch flow by pump 10 to externally-heated desorber 1.

17 Claims, 6 Drawing Sheets

BRANCHED GAX ABSORPTION VAPOR COMPRESSOR

DESCRIPTION

1. Technical Field

This invention relates to absorption vapor compressors such as are found in continuous cycle heat pumps based on the absorptive principle, i.e., wherein a condensable vaporous working fluid is successively absorbed into and desorbed out of a circulating absorbent solution. The improved cycle described herein applies to all known types of absorption heat pumps: residential and commercial space heating and cooling types; industrial refrigeration and industrial heat pumping; cryogenic refrigeration; heat or cold storage; open cycle, semi-open or closed cycle types; and any type of absorbent, whether volatile or non-volatile.

2. Background

Absorption heat pumps (AHP) and absorption refrigeration systems use the principle of "boiling point elevation" to pump heat from a lower to a higher temperature (a "lift"), using as the motive power a "drop" (decrease in temperature) of another quantity of heat. The absorption working pair (AWP) (a mixture of absorbent component plus a condensable working fluid or refrigerant) exhibits the boiling point elevation relative to the boiling point of the pure working fluid at the same pressure. The AHP ordinarily incorporates a condenser and evaporator with the same functions as in the more familiar mechanical compression heat pump (MCHP). The AHP differs from the MCHP in the type of compressor used, and in the motive power (heat vs. mechanical shaft power). Whereas absorption vapor compressors are most commonly found in absorption heat pumps, they also find use in other applications such as power cycles or simple compression duty.

The full potential of absorption cycle devices such as AHP have never been fully realized owing to limitations of the known AWPs, and also to limitations of the known cycle configurations. In recent years a number of promising new AWPs have been disclosed, e.g., in U.S. Pat. Nos. 4,454,724, 4,563,295, 4,652,279, 4,614,605, 4,784,783 and 4,801,393. There has also been a great deal of effort on new cycles, as evidenced by U.S. Pat. Nos. 4,531,374, 4,448,040, and 4,442,677. However, certain known cycle limitations have proved intractable up to this time, as described below.

The well-known single-effect cycle achieves a very impressive 65% of Carnot efficiency, but only at a specific combination of lift and drop. When higher drops are available, the COP remains approximately constant, causing the Carnot efficiency to decrease. Similarly, the double-effect cycle also achieves about 65% of Carnot efficiency, but again only at a specific lift/drop combination. If the double effect cycle is operated below its required "drop", the Coefficient of Performance (COP) degrades drastically. These considerations are illustrated, for example, in FIG. 1 of U.S. Pat. No. 4,442,677.

There are two primary ways in which double-effect AHP operation (double use of the driving heat) can be achieved: by pressure staging or by concentration staging. Numerous studies have shown that concentration staging yields higher COP than pressure staging. This is because absorber heat release is invariably higher than condenser heat release, and also because the lower pressures entail lower pump power. Nevertheless, absorbent solution pumping losses and absorbent solution heat exchange losses remain undesirably high. When they are reduced by slowing the circulation rate and accepting a larger concentration change, the solution loop hysteresis becomes larger, thereby increasing the required temperature drop, and making less temperature differential available for heat exchange.

Another problem with the double concentration effect cycle is encountered when using volatile absorbents. The absorbent will tend to migrate out of the higher concentration (higher temperature) effect and collect in the other effect. Separate means must be incorporated to restore the proper inventories. In many heat pumping applications of interest, e.g., space conditioning, the maximum generator temperature is fixed by corrosion and/or stability considerations, whereas the temperature of the captured heat varies widely due to ambient temperature variations. The AHP lift and drop must be designed for specific limiting conditions, and hence at more benign ambient conditions the AHP will operate at markedly lower Carnot efficiency, as explained above. This must be contrasted with mechanical compression heat pumps, which have a lower Carnot efficiency at the design point but will usually be more efficient at more benign conditions.

In recent years there has been a resurgence of interest in a historically-known absorption cycle which partially avoids the above disadvantages. The "Generator-Absorber Heat Exchange" (GAX) cycle incorporates the conventional externally-cooled absorber and externally-heated generator, but it additionally incorporates a lower temperature generator and a higher temperature absorber which overlap in temperature, and which are in heat exchange relationship. The cycle is a "two-pressure" cycle, i.e., both generators are at the same (higher) pressure, and both absorbers are at the same (lower) pressure. A single absorbent solution pump circulates the absorbent sequentially through all four components in the sequence GAX desorber/externally heated desorber/GAX absorber/externally cooled absorber/pump. Normally the cycle also incorporates "absorber heat exchange" (AHX) (preheat of the absorber solution enroute to the GAX desorber by the externally cooled absorber) and "generator heat exchange" (GHX) (precooling of the absorbent solution enroute to the GAX absorber by the externally-heated desorber).

The advantages of the GAX cycle include; 1) the exceptionally large change in solution concentration markedly reduces solution pumping and solution heat exchange losses; 2) since there is only a single pumped loop, solution inventory and migration is no problem; 3) cycle pressure does not exceed the pressure of the externally cooled condenser; 4) the cycle automatically becomes an efficient single-effect cycle outside of the temperature overlap range; and 5) within the temperature overlap range, the COP improves with more benign ambient temperatures.

The existing state-of-the-art of GAX cycles is well summarized in the two technical articles "Development of an Advanced-Cycle Absorption Heat Pump for Residential Applications," by B. A. Phillips, Proceedings of the 2nd DOE/ORNL Heat Pump Conference: Research and Development on Heat Pumps for Space Conditioning Applications published by the Oak Ridge National Laboratory, CONF8804100, August 1988; and "Analysis of Advantages and Limitations of Absorber- Generator Heat Exchange" by J. Scharfe et al., *International Journal of Refrigeration*, Volume 9, November 1986.

The former article describes many of the characteristics enumerated above, and also discloses the use of an intermediary heat transfer loop to transfer heat from the GAX absorber to the GAX desorber. The latter article points out the undesirability of an intermediary heat transfer loop, since the GAX benefit does not begin until temperature overlap is achieved, i.e., at a very large drop relative to the lift, and the intermediary loop increases the required drop. Both articles also point out that within the overlap range, the heat-release capability of the GAX absorber is always less than the heat-accepting capability of the GAX desorber, which further limits the advantage obtainable from the GAX cycle.

What is needed, and one objective of the novel cycle disclosed herein, is a means of increasing the heat released in the absorber component of a GAX exchanger (the GAX absorber) to more closely match the heat demand of a desorber component (GAX desorber) having approximately the same temperature difference as the absorber component. Another need, and corresponding objective, is to retain the high COP and low pumping power advantages of the double-concentration-effect cycle, while reducing the penalties of that cycle associated with absorbent solution heat exchange and solution migration.

DISCLOSURE OF INVENTION

The above and other useful objects are obtained by providing apparatus and corresponding process for at least one of compressing a vapor and providing heating and/or cooling, by absorbing a vapor into at least two absorbers at a first pressure and desorbing the vapor from at least two desorbers at a second pressure which is higher than the first pressure, wherein at least one of the absorbers (other than the lowest temperature one) is in heat exchange relationship with at least one of the desorbers (other than the highest temperature one), and wherein additional apparatus is provided to cause the flow of absorbent component through the heat exchange relationship absorber to be significantly higher than the flow of absorbent component through the heat exchange relationship desorber. The enabling additional apparatus is comprised of a flow splitter for dividing absorbent flow from the heat exchange relationship absorber, a conduit for supplying a major portion of the divided flow to one of the other (lower temperature) absorbers; a second conduit for supplying the remainder of the divided flow to a branch pump which increases the pressure of the branch flow to approximately the second pressure; and a join which combines the branch flow with absorbent from the heat exchange relationship desorber and routes the combined absorbent stream to another (higher temperature) desorber.

It will be obvious to the artisan that the GAX absorber duty could be achieved in two separate absorbers instead of only one, and further that the sorbent flow through one could be made equal to the branch sorbent flow. In that embodiment the sorbent flow splitter would be at the inlet side of the GAX absorbers, vice at the outlet. It will further be obvious that the externally-fired generator can similarly be comprised of two separate sections in parallel, whereby the branch loop sorbent flow remains separate from the primary loop sorbent flow. In that event, neither a splitter nor a join is required. The essential feature in all embodiments is that the amount of absorbent component flowing through the functions of GAX absorber and externally heated desorber be greater than that flowing through the remaining absorber(s) and desorber(s), regardless of whether those respective functions are each accomplished by one or two physical units.

This modified GAX cycle, with branched absorbent flow, termed the branched GAX cycle, may be applied in conjunction with either volatile or non volatile absorbents. With volatile absorbents, it is important that the flow of vapor and liquid in both components of the GAX exchanger be countercurrent. Countercurrent flow allows the contacting vapor and liquid streams to stay close to the equilibrium compositions, thus avoiding mixing losses. This is necessary to achieve the large temperature change necessary across each component of the GAX exchanger.

Most practical stationary countercurrent contact systems have liquid falling under the influence of gravity, and vapor rising. This is preferably done in the GAX absorber and GAX generator of the branched GAX cycle when using a volatile absorption working pair (AWP) such as $NH_3$—$H_2O$. However, it results in the temperature gradient of the two components being in the opposite direction (increasing temperature with downward absorbent flow in the GAX desorber, decreasing temperature with downward flow in the GAX absorber). Thus direct exchange of heat between the two components is impractical, and an intermediary heat transfer loop (preferably closed cycle) must be used.

Figure 6:
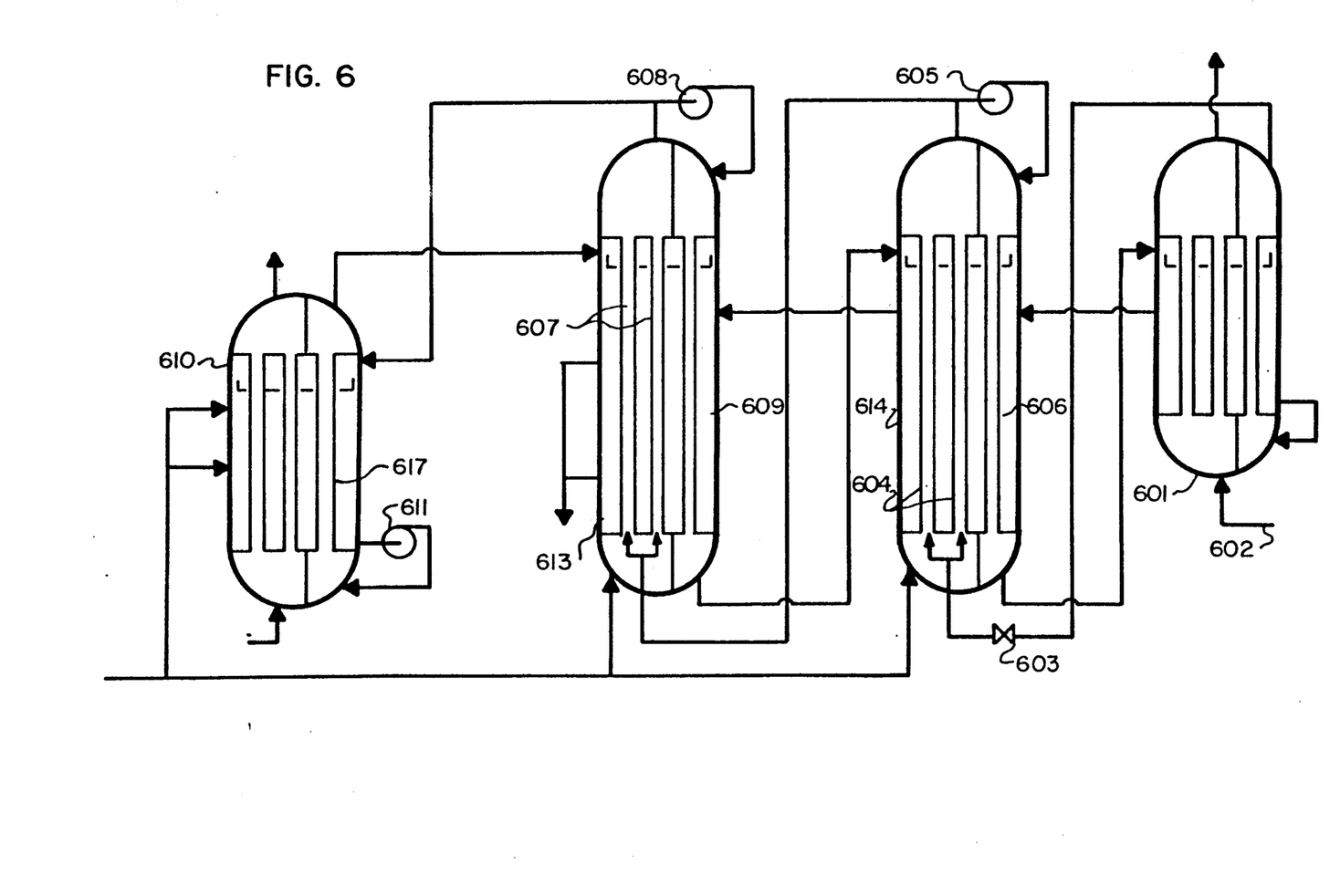
FIG. 6 is a simplified flowsheet of the FIG. 4 cycle.

With non-volatile AWPs such as $H_2O$-inorganic salt, the vapor is always essentially pure refrigerant (e.g., steam), and mixing losses are not a problem. Therefore co-current vapor liquid flow is acceptable. This permits an exceptionally efficient and low cost GAX exchanger design: a single-vessel direct-heat-exchange configuration, with the respective absorbent streams flowing in countercurrent directions. This is illustrated in FIG. 6. One possible construction is to have upward flow of desorbing liquid inside vertical tubes, co-current with desorbed vapor, and a falling film of absorbing liquid outside the tubes. This is disclosed in U.S. Pat. No. 4,846,240. However, it has been discovered that significantly higher overall heat and mass transfer rates can be achieved from upward co-current flow of absorbing liquid and vapor inside the tubes, and falling-film flow of desorbing liquid outside the tubes, provided the gas and liquid flow within the tubes achieves slug or churn flow regime over a significant fraction of the tube length. This absorption regime is described in "Heat and Mass Transfer in Vertical Tubular Bubble Absorbers for Ammonia-Water Absorption Refrigeration Systems" by C. A. Infante Ferreira et al., *International Journal of Refrigeration*, Butterworth & Co., Ltd., Vol. 7, No. 6, November 1984. The slug flow regime is obtained as described therein, e.g., by ensuring the liquid and vapor mass flow rates are in the proper proportions.

Figure 5:
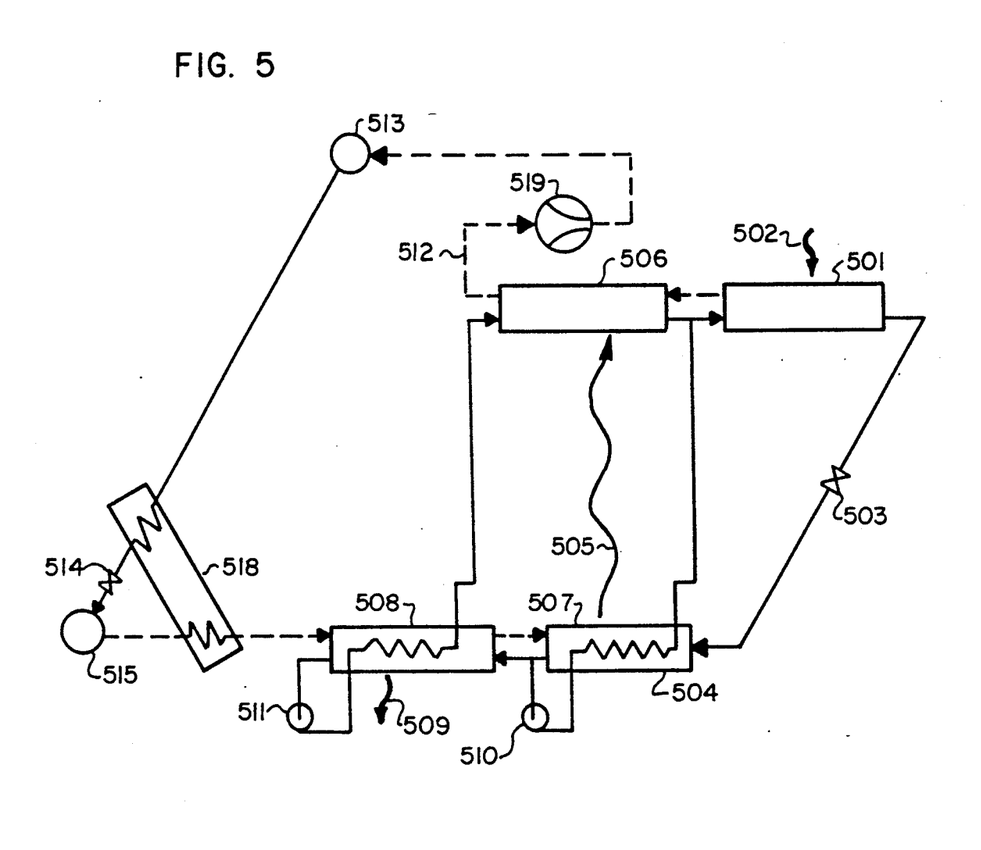
FIG. 5 is a cycle diagram for a hybrid branched GAX cycle plus booster compressor, where the booster compressor is in the high pressure portion of the cycle.

There may be more than one GAX exchanger. In order to obtain the full benefit of each GAX exchanger, each should be accompanied by another absorbent branch. That is illustrated in FIGS. 5 and 6. Also, each additional absorbent branch is preferably fitted with AHX from its associated absorber.

The branched GAX cycle, as disclosed herein, increases cycle COP by about 30% relative to simple GAX, and retains all the other GAX advantages enumerated above. The amount of solution pumped and the amount of heat duty per unit quantity of captured heat varies negligibly from that of the simple GAX cycle. Maximum cycle pressure and temperature are unchanged. The only cost of achieving the 30% increase in performance is the branch component—splitting the pump duty between two pumps instead of one.

BEST MODE FOR CARRYING OUT THE INVENTION

Figure 1:
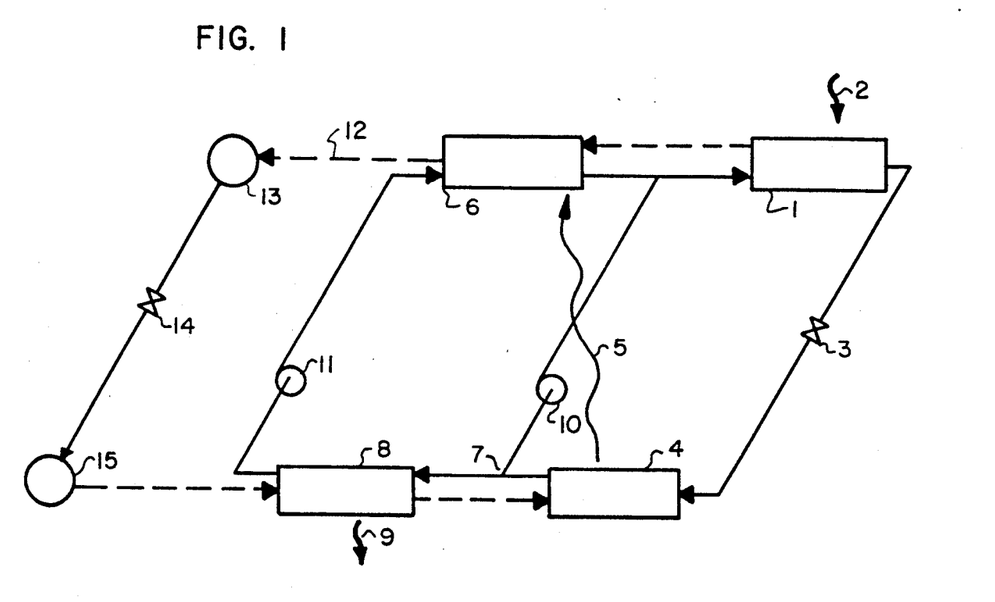
FIG. 1 illustrates figuratively the essence of the simplest embodiment of the invention—the addition of a pumped absorbent branch to a single GAX cycle.

Referring to FIG. 1, this cycle diagram reflects the usual convention that horizontal lines signify constant pressure, vertical lines signify constant temperature, diagonal lines signify constant absorbent solution concentration, solid lines signify absorbent solution flow, dashed lines signify vapor flow, and wavy lines signify heat flow. Externally heated desorber 1 receives external heat 2 and discharges concentrated ("strong") absorbent solution to pressure letdown valve 3, and thence to the hot end of GAX absorber 4. After absorbing vapor in GAX absorber 4 and releasing internal heat 5 which is transferred to GAX desorber 6, the partially diluted absorbent solution exits the warm end of GAX absorber 4 and is divided into two streams by splitter 7. One stream, the major flow, continues to the warm end of externally-cooled absorber 8, cooled by source of cooling 9. The other stream is increased in pressure by pump 10 and then routed to externally heated desorber 1. After further dilution in absorber 8, the remaining liquid stream is increased in pressure by pump 11 and supplied to the cool end of GAX desorber 6. Compressed vapor desorbed from desorbers 1 and 6 is routed via conduit 12 to condenser 13. Condensate is let down in pressure by means of pressure reduction 14 and routed to evaporator 15. Low pressure vapor from evaporator 15 is then routed to absorbers 4 and 8 to complete the cycle.

Figure 2:
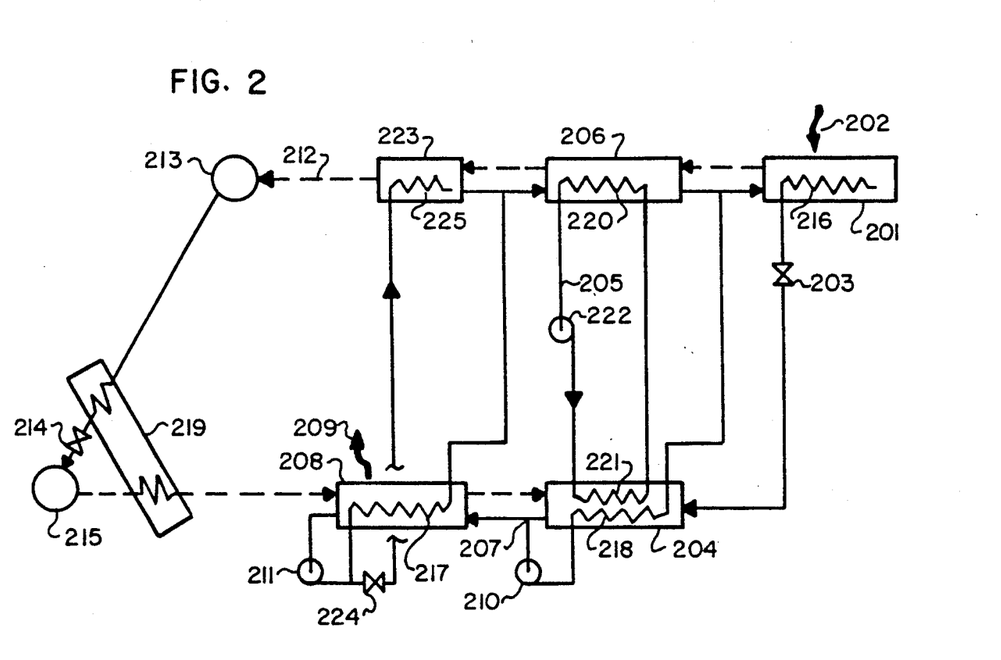
FIG. 2 illustrates the basic cycle together with several normally preferred enhancements: AHX, GHX, liquid refrigerant subcooling, rectification, and an intermediary heat transfer loop (the latter two only for volatile absorbents).

The cycle depicted in FIG. 2 incorporates several additional efficiency-enhancing features which would normally be preferred. Components 201 through 215 correspond to the similarly numbered components 101 through 115 of FIG. 1. In FIG. 2, the sorbent exiting desorber 201 undergoes GHX in heat exchanger 216. The sorbent from pump 211 undergoes AHX in heat exchanger 217 enroute to absorber 206, and similarly the sorbent from pump 210 undergoes AHX in heat exchanger 218. The liquid refrigerant supply to evaporator 215 undergoes subcooling by exchanging heat with low pressure vapor in heat exchanger 219. The transfer of heat from GAX absorber 204 to GAX desorber 206 is accomplished via an intermediary heat transfer loop 205, comprised of heating surface 220, cooling surface 221, and means for circulating the heat transfer fluid 222, e.g., a pump. The pump is preferably located in the cold leg of the heat transfer loop. Finally a rectifier 223 is provided to reduce the amount of volatile absorbent in the desorbed vapor supplied to the condenser 213. The rectifier reflux is preferably provided by regulating part of the discharge of pump 211 by regulator 224 and supplying it to reflux heat exchange reflux coil 225.

Figure 3:
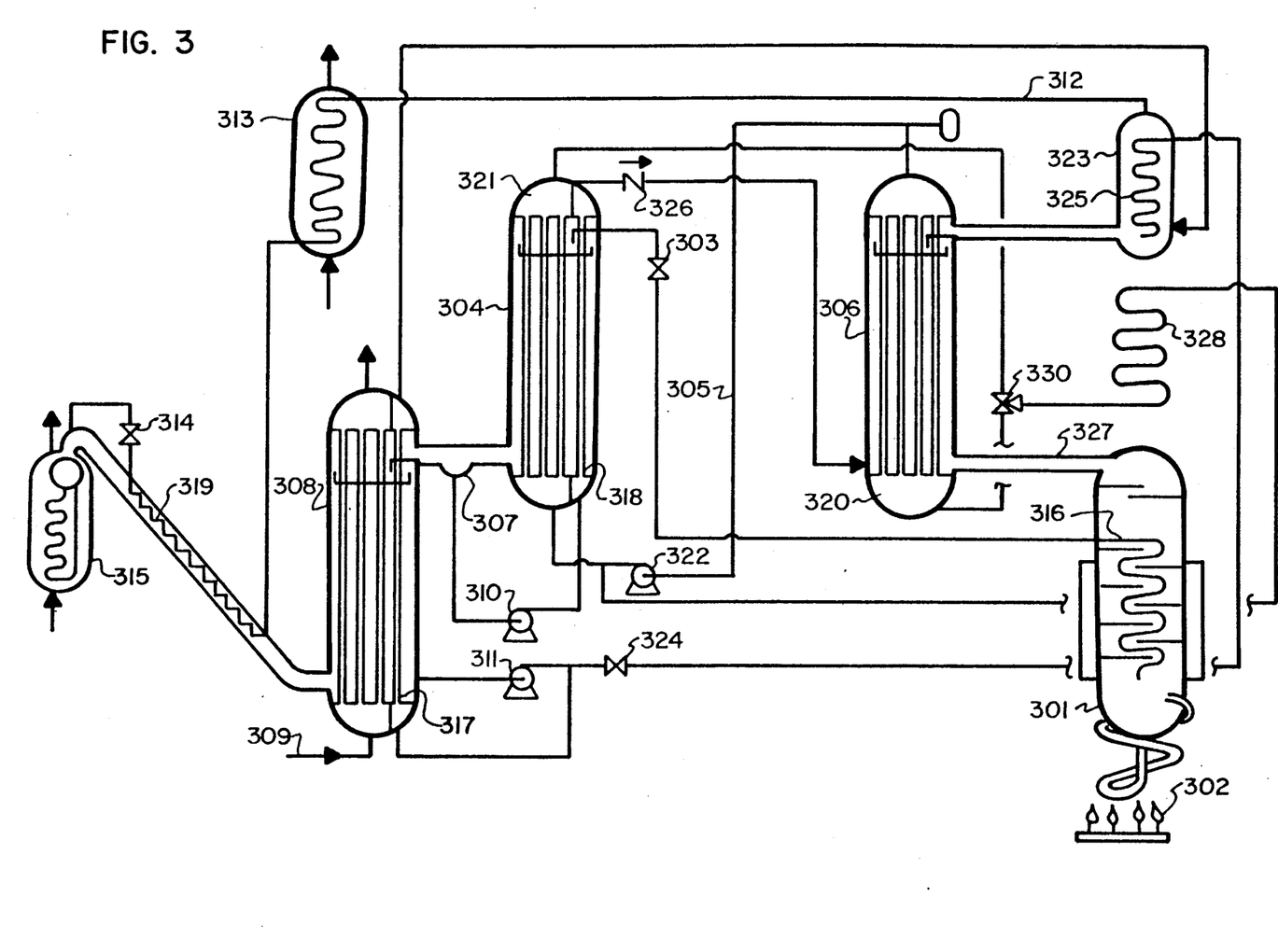
FIG. 3 is a simplified flowsheet of the cycle diagram depicted in FIG. 2.

FIG. 3 is a simplified flowsheet depiction of the cycle illustrated in FIG. 2. The components 301 through 325 correspond to the similarly numbered FIG. 2 components. The branch sorbent pump 310 discharge is sensibly heated in exchanger 318, then flows through backflow preventor 326 to the juncture point between GAX desorber 306 and externally-heated desorber 301. Sorbent from pump 310 and desorber 306 flows through conduit 327 countercurrently to desorbed vapor. An additional feature shown in FIG. 3 is heat scavenging coil 328, which is supplied a side stream of flow from heat transfer medium pump 322 via regulating valve 329 to extract lower temperature heat from the combustion exhaust gas. The heated medium is rejoined with heat supply to the GAX desorber 306 at join 330.

Figure 4:
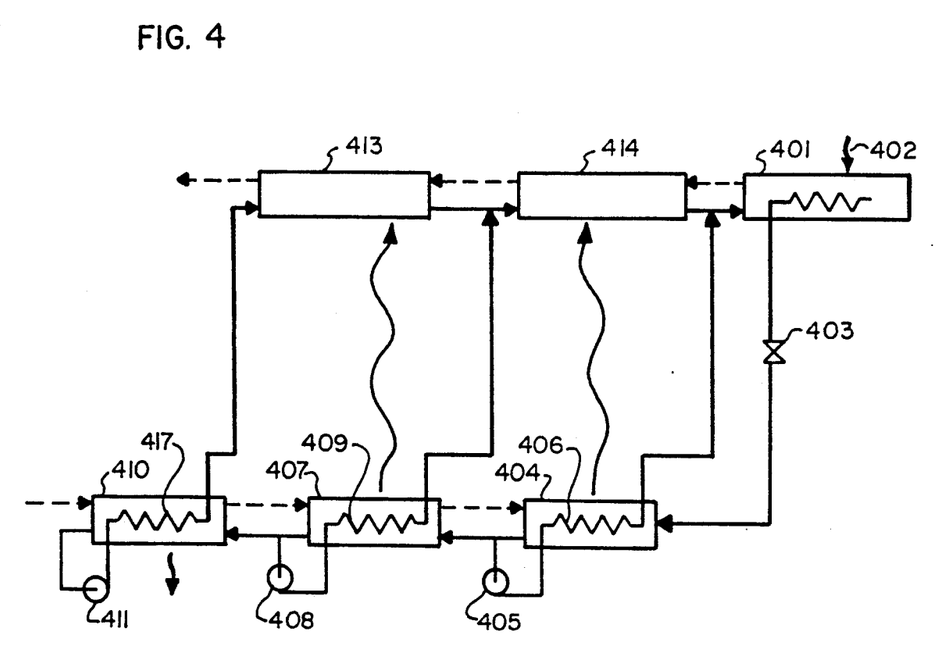
FIG. 4 illustrates two GAX exchangers and two branch absorbent flows in an open cycle (vapor compression) configuration.

FIG. 4 is a cycle depiction of a branched GAX cycle with two branches and two GAX exchangers, complete with AHX and GHX, and also doubly-open cycle (no condenser or evaporator). Externally heated generator 401 has exiting sorbent via GHX exchanger 402 to letdown valve 403 and thence to higher temperature GAX absorber 404. A branch of sorbent exits absorber 404 via pump 405, and AHX exchanger 406, back to desorber 401. The remaining sorbent continues to lower temperature GAX absorber 407, from which a branch exits via sorbent pump 408 and AHX exchanger 409. The new remaining sorbent is supplied to externally-cooled absorber 410. All of the sorbent from it is supplied to pump 411, and thence via heat exchange (e.g., in AHX exchanger 412) to lower temperature GAX desorber 413. Sorbent from desorber 413 and from pump 408 is supplied to higher temperature GAX desorber 414. Low pressure vapor is supplied to all three absorbers, and compressed vapor is withdrawn from all three desorbers. This configuration is useful when the available drop greatly exceeds the required temperature lift, e.g., in evaporation processes or steam compression.

FIG. 5 illustrates one possible means of combining a mechanical compressor with the disclosed branched GAX thermally-actuated absorption compressor. Components 501 through 515 are described similarly as the corresponding numbered components of FIG. 1. Exchanger 516 and 517 are the AHX exchangers, and exchanger 518 is the refrigerant subcooler. The added component is mechanical compressor 519, which increases the lift obtainable from the temperature drop supplied to the GAX cycle, i.e., the temperature difference between heat supply 502 and heat rejection 509. As described in U.S. Pat. Nos. 4,724,679 and 4,531,374, there are many other possible ways of combining a mechanical compressor and an absorption compressor such as the branched GAX one disclosed hereby.

FIG. 6 is a simplified flowsheet depiction of the cycle illustrated in FIG. 4. The components 601 through 617 are described similarly as the correspondingly numbered components of FIG. 4.

I claim:

1. An absorption cycle apparatus adapted for compressing a vapor comprised of:
   (a) a generator which is heated by an external source of heat;
   (b) an absorber which is cooled by an external source of cooling;
   (c) a second generator, and a second absorber which is cooled by supplying heat to said second generator;
   (d) a means for transporting absorbent liquid from said absorber to said second generator;
   (e) a means for branching the absorbent flow from said second absorber into at least two streams and transporting one stream to said absorber and the remaining stream to said generator;
   (f) at least one conduit for supplying vapor to said absorbers;
   (g) at least one conduit for removing compressed vapor from said generators, and;
   (h) a generator heat exchange (GHX) exchanger in said generator.

2. The absorption cycle apparatus according to claim 1 additionally comprised of:
   (a) an absorber heat exchange (AHX) exchanger in said absorber for exchange of heat between fluids contained therein and absorbent liquid exiting therefrom; and
   (b) an absorber heat exchange (AHX) exchanger in said second absorber for exchange of heat between fluids contained therein and said branched absorbent stream to said generator.

3. An absorption cycle apparatus adapted for at least one of useful heating and useful cooling comprised of:
   (a) a generator which is heated by an external source of heat;
   (b) an absorber which is cooled by an external source of cooling;
   (c) a second generator, and a second absorber which is cooled by supplying heat to said second generator;
   (d) a means for transporting absorbent liquid from said absorber to said second generator;
   (e) a means for branching the absorbent flow from said second absorber into at least two streams and transporting one stream to said absorber and the remaining stream to said generator;
   (f) an evaporator which supplies said useful cooling and said vapor;
   (g) a condenser which receives said compressed vapor and supplies part of said useful heating; and
   (h) a generator heat exchange (GHX) exchanger in said generator.

4. The absorption cycle apparatus according to claim 3 additionally comprised of a charge of volatile liquid absorbent, and wherein both said second absorber and said second generator are adapted for countercurrent contact between vapor and said absorbent liquid.

5. The absorption cycle apparatus according to claim 4 additionally comprised of a closed cycle heat transfer loop which transfers heat from said second absorber to said second generator.

6. The apparatus according to claim 4 wherein said first absorber and first generator are adapted for countercurrent vapor-liquid contact, and additionally comprised of a rectifier for the desorbed vapor.

7. The apparatus according to claim 6 additionally comprised of:

a) an absorber heat exchange (AHX) exchanger in each of said first and second absorbers; and
b) a reflux heat exchanger in said rectifier; and
c) a means for supplying sorbent to said reflux heat exchanger.

8. The apparatus according to claim 7, adapted for space conditioning, and wherein said absorbent is aqua ammonia, and additionally comprised of a condenser, an ammonia subcooler, an ammonia pressure letdown valve, an evaporator, and a sorbent pressure letdown valve.

9. The apparatus according to claim 3 additionally comprised of direct heat exchange between said second absorber and said second generator.

10. The apparatus according to claim 9 additionally comprised of:
   a) a charge of non-volatile absorbent;
   b) a means for establishing upward slug flow of absorbent and vapor in said second absorber; and
   c) a means for establishing vertical falling film flow of sorbent in said second generator.

11. The apparatus according to claim 3 additionally comprised of a third absorber and third generator in heat exchange relationship, and a pump which transports part of the sorbent from said third absorber to one of said generators.

12. A thermally activated process for at least one of compressing a vapor, heating, and cooling comprising:
   a) absorbing said vapor into a circulating absorbent liquid over an absorbing temperature range,
   b) cooling the absorbent liquid in the lower temperature portion of said absorbing step with an external source of cooling;
   c) desorbing compressed vapor from said circulating absorbent liquid over a desorbing temperature range;
   d) heating the absorbent liquid in the higher temperature portion of said desorbing step with an external source of heating;
   e) heating the absorbent liquid in the lower temperature portion of said desorbing step and cooling the absorbent liquid in the higher temperature portion of said absorbing temperature range by exchanging heat there-between;
   f) circulating a major fraction of a liquid absorbent comprised of absorbent component and condensed vapor sequentially through all of both of said absorbing and desorbing steps; and
   g) circulating a minor fraction of said liquid absorbent between only the higher temperature portion of said absorbing step and the higher temperature portion of said desorbing step, whereby the amount of absorbent component circulated to those portions exceeds that circulated to the remaining portions.

13. An apparatus for the compression of a vapor by the application of heat comprised of:
   (a) a first absorber and a second absorber, each adapted to receive part of said vapor;
   (b) a first desorber and a second desorber;
   (c) a means for supplying said heat to said second desorber;
   (d) a means for transferring heat from said first absorber to said first desorber, said means for transferring heat comprised of:
      (i) vertically oriented heat transfer tubes;
      (ii) a means for supplying sorbent liquid and vapor to the inside of the tubes at the bottom; and (iii) a means for supplying sorbent liquid to the outside of the tubes at the top;
(e) a means for transporting sorbent from said second absorber to said first desorber;
(f) a separate means for transporting sorbent from said first absorber to said second desorber and to said second absorber.

14. The apparatus according to claim 13 wherein said means for transferring heat is comprised of:
a) vertically oriented heat transfer tubes;
b) a means for supplying sorbent liquid and vapor to the inside of the tubes at the bottom; and
c) a means for supplying sorbent liquid to the outside of the tubes at the top.

15. The process according to claim 12 additionally comprising:
(a) exchanging sensible heat between fluid undergoing said higher temperature portion of said desorbing step and sorbent liquid withdrawn therefrom;
(b) exchanging sensible heat between fluid undergoing said lower temperature portion of said absorbing step and said major fraction of sorbent liquid;
(c) exchanging sensible heat between fluid undergoing said higher temperature portion of said absorbing step and said minor fraction of sorbent liquid;
(d) routing liquid sorbent through the desorption step portions in order of increasing temperature and countercurrently withdrawing vapor therefrom in order of descreasing temperature; and
(e) routing liquid sorbent through the absorption step portions in order of decreasing temperature and countercurrently supplying vapor thereto in order of increasing temperature.

16. The apparatus according to claim 2 additionally comprised of:
(a) an absorber heat exchange (AHX) exchanger in said externally-cooled absorber;
(b) an absorber heat exchange (AHX) exchanger in said internally-cooled absorber;
(c) vapor conduit for withdrawing vapor from the sorbent-liquid-supply portion of said externally-cooled absorber and supplying said vapor to the sorbent-liquid-withdrawal portion of said internally-cooled absorber; and
(d) vapor conduit for withdrawing vapor from the sorbent-liquid-supply portion of said externally-heated desorber and supplying said vapor to the sorbent-liquid-withdrawal portion of said internally-heated desorber.

17. Apparatus according to claim 4 wherein said externally-cooled absorber, said externally-heated desorber, and said GAX absorber and GAX desorber are all adapted for internal countercurrent vapor-liquid contact, and also for inter-component countercurrent vapor-liquid contact.

* * * * *